United States Patent [19]

Soukup

[11] Patent Number: 4,471,555
[45] Date of Patent: Sep. 18, 1984

[54] FISHING POLE ELECTRIC BITE INDICATING SYSTEM

[76] Inventor: Dale F. Soukup, 310 Ruby La., Carson City, Nev. 89701

[21] Appl. No.: 475,171

[22] Filed: Mar. 14, 1983

[51] Int. Cl.$^3$ ............................................ A01K 97/12
[52] U.S. Cl. ...................................................... 43/17
[58] Field of Search ..................................... 43/16, 17

[56] References Cited

U.S. PATENT DOCUMENTS

| | | | |
|---|---|---|---|
| 3,074,196 | 1/1963 | Bronson, Sr. | 43/17 |
| 3,680,244 | 8/1972 | Cala | 43/17 |
| 3,740,888 | 6/1973 | Young | 43/17 |
| 3,959,910 | 6/1976 | Montgomery | 43/17 |
| 4,178,712 | 12/1979 | Williams | 43/17 |
| 4,418,489 | 12/1983 | Mathauser | 43/17 |

Primary Examiner—Nicholas P. Godici
Assistant Examiner—Christopher L. McKee
Attorney, Agent, or Firm—Keith D. Beecher

[57] ABSTRACT

A fishing pole electric bite indicating system which comprises a rigid mount in the form of an elongated channel member extending coaxially along a portion of the pole in the vicinity of the reel and adhesively attached to the pole by means, for example, of silicone rubber, and a stud extending outwardly from the channel member; together with an electrical unit detachably mounted on the channel member by a screw extending through the housing of the electrical unit and into the stud. The electrical unit includes a resilient tension arm which extends out from the housing of the unit and which engages the fishing line associated with the pole. Any increased tension on the line due to a bite causes the tension arm to bend and complete an electric circuit to an electrically energized alarm unit such as a minature piezo alarm unit which, together with a battery, may be mounted in the housing. The tension arm is attached to a shaft within the unit. A slip clutch prevents rotation of the shaft when the tension arm responds to a bite. However, the shaft may be manually turned within the clutch to adjust the normal angular position of the tension arm.

7 Claims, 7 Drawing Figures

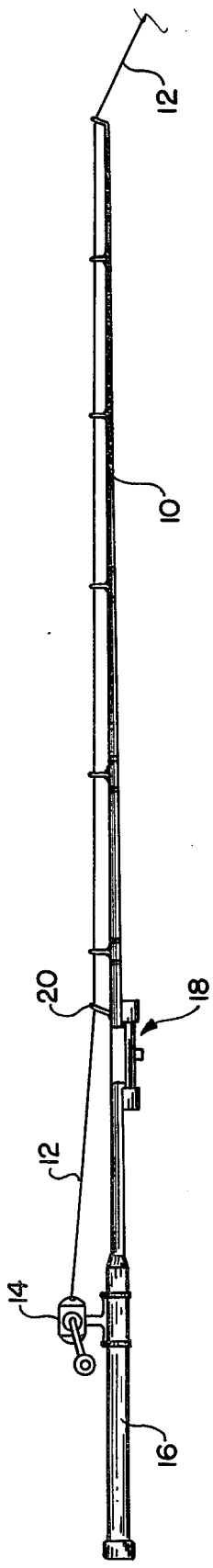
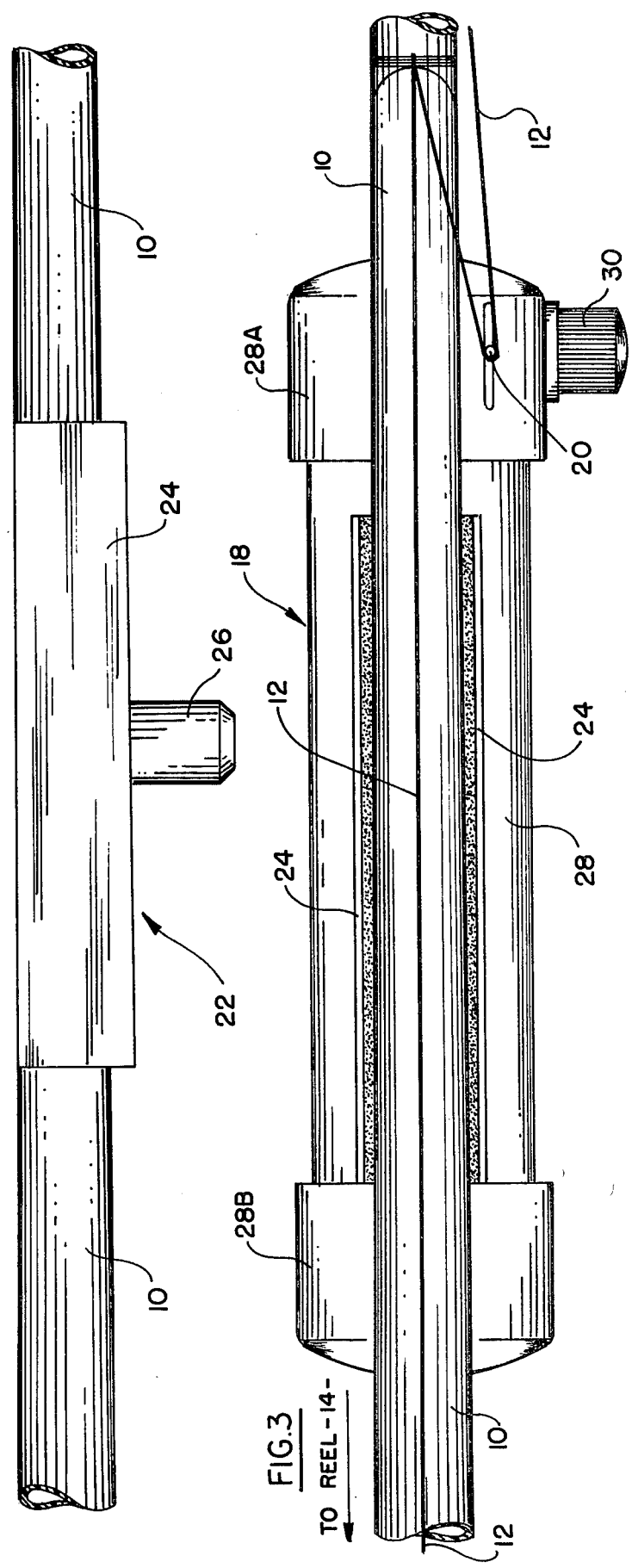

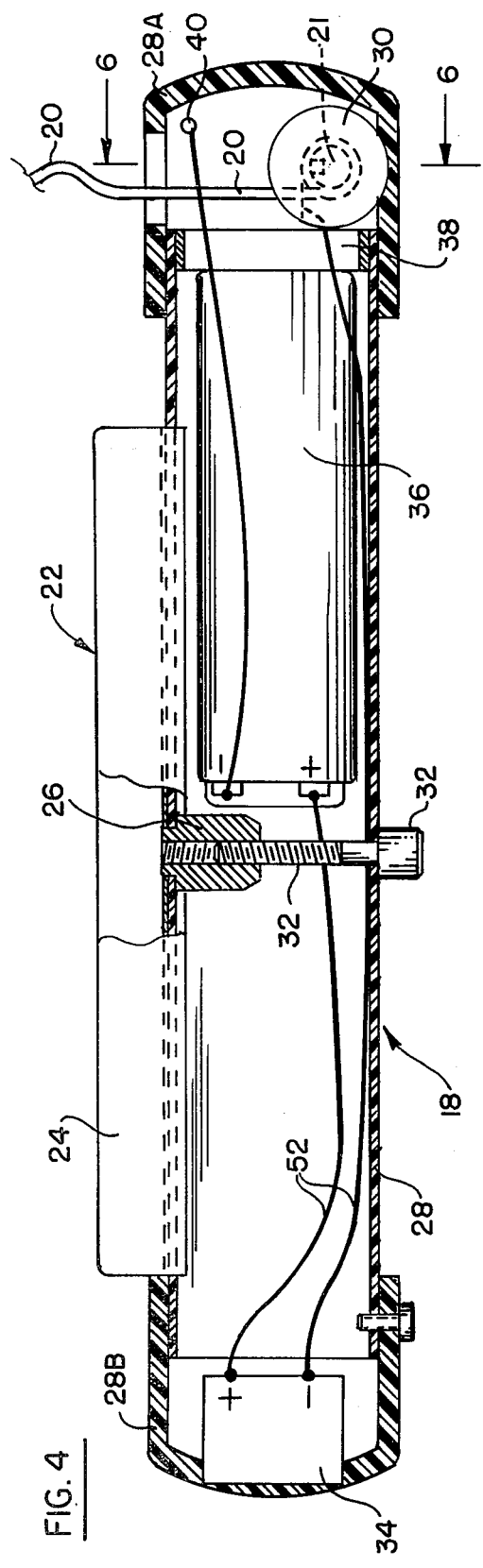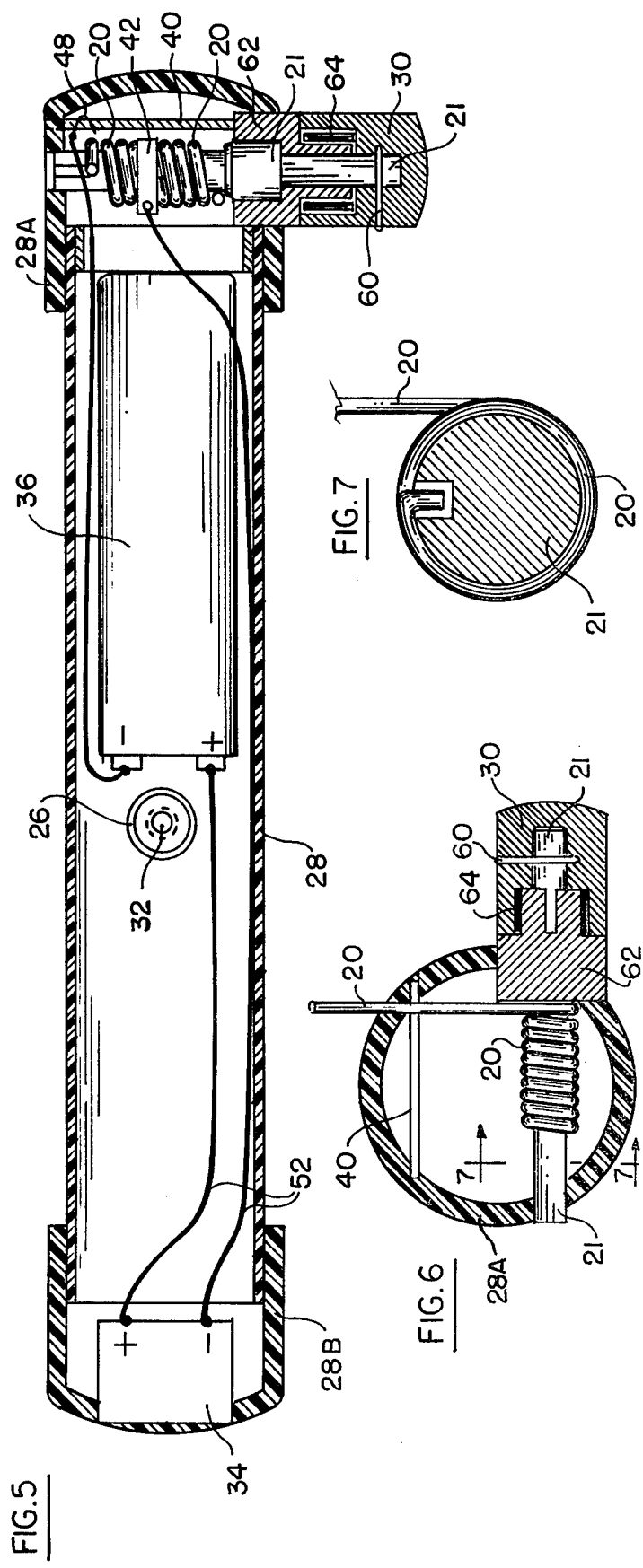

FISHING POLE ELECTRIC BITE INDICATING SYSTEM

BACKGROUND OF THE INVENTION

Fishing bite signaling devices are generally known to the art. One class of such devices, for the most part, comprise a rod holding socket pivotally connected to an earth supported standard and including an electric circuit for exciting a visual or aural signaling device when the socket is pivoted due to the occurrence of a bite. Such devices, for example, are disclosed in U.S. Pat. Nos. 2,704,411; 2,745,088; 3,713,131; 3,645,028 and 3,359,672.

Another class of bite signaling attachments for fishing poles are also known in which the fishing line associated with the pole extends across a movable switch controlling element, and the increased tension of the line when a bite occurs produces sufficient pressure on the element to cause it to actuate a switch and thereby to energize an electrically activated visual or aural signaling device. Such an attachment is described, for example, in U.S. Pat. No. 2,964,869.

The system of the present invention belongs to the class described in the preceding paragraph. The prior art systems for the most part have proven to be relatively complicated and expensive. Accordingly, it is a principal objective of the present invention to provide a rugged and light weight bite signaling unit which is relatively simple and easy to operate, and one which can be manufactured with a minimum of expense and in a minimum of time.

As explained briefly above, the electric bite indicating system of the invention is mounted directly on the fishing pole itself. Since most fishing poles are composed of thin-walled hollow fiberglass, it is not feasible to clamp the signaling unit onto the pole itself, since the required clamping force would crush the pole. In accordance with the present invention, a rigid elongated channel member formed, for example, of aluminum or other suitable material is coaxially mounted on the pole and is adhesively attached to the pole by silicone rubber, or other appropriate adhesive material. The unit containing the electrical and mechanical components of the indicator system of the invention is then detachably mounted on the channel by a screw-stud combination.

With the construction descibed above, appropriate mounts may be attached to a number of fishing poles, with a single indicating unit being used for all the poles, this being achieved simply by attaching the unit to whichever pole is selected on any particular occasion.

BRIEF DESCRIPTION OF THE DRAWINGS

FIG. 1 is a side view of a fishing pole with a unit constructed in accordance with the present invention detachably mounted on the pole;

FIG. 2 is an enlarged segment of the pole of FIG. 1 with the bite indicating unit removed, and showing the details of a mount for detachably holding the unit on the pole;

FIG. 3 is an enlarged view of a portion of the fishing pole, and showing the manner in which the unit of the invention is attached to the pole;

FIG. 4 is a side section showing the bite indicating unit of the invention in one of its embodiments;

FIG. 5 is a side section of the bite indicating unit, similar to FIG. 3, but turned 90° on its longitudinal axis;

FIG. 6 is a cross-sectional view of the unit of FIG. 4 taken essentially along the line 6—6 of FIG. 4; and FIG. 7 is an enlarged representation of an end view of a shaft shown in FIG. 6, taken along the lines 7—7 of FIG. 6.

DETAILED DESCRIPTION OF THE ILLUSTRATED EMBODIMENT

A fishing pole 10 is shown in FIG. 1 which supports a fishing line 12 which extends into a usual reel 14 attached to the handle 16 of the fishing pole.

A bite indicator unit designated 18 is mounted on the fishing pole 10 adjacent to the handle 16. A tension arm 20 extends out from the unit 18, and engages the fishing line 12. Tension arm 20 is formed of any appropriate resilient material. When a bite occurs resulting in increased tension being exerted on the fishing line 12, the tension arm bends and completes an electric circuit, in a manner to be described, so as to activate an electrically energized visual or aural signaling device. If the increased tension on the fishing line is only momentary, the arm 20 immediately springs back to its original position precluding false activations of the alarm unit. The tension arm 20, as best shown in FIG. 4, has a serpentine shape with large radiused bends. This shape makes it easy to disengage the line 12 from the arm for normal reeling in of a fish when a fish is hooked. The line is merely pushed off of the end of arm 20 with one finger and there is no need to unhook the line from the arm.

Due to the fragile nature of the fishing pole, as described above, the unit of the invention is detachably mounted on a pole mount 22. The pole mount 22 is in the form of an elongated rigid channel member 24 formed, for example, of aluminum or other suitable material, the channel member being adhesively attached to the pole 10 by an appropriate adhesive such as silicone rubber. The bite indicator unit 18 is detachably mounted on channel member 24 by a screw (to be described) which extends into a stud 26 affixed to the channel member.

As shown in FIG. 3, the bite indicator unit 18 is contained in a tubular housing 28 having a cap 28A on one end, and a cap 28B on the other end. The tubular housing 28 and caps 28A, 28B may be formed of an appropriate plastic material such as polyvinylchloride (PVC).

As shown in FIG. 3, the tension arm 20 extends out through a slot in cap 28A, and the fishing line 12 is looped around the tension arm. A knob 30 is mounted on cap 28A, and this knob may be turned to set the tension arm 20 in its set position, to be moved to its active position upon increased tension of the fishing line 12 due to a bite.

As shown in FIG. 4, housing 28 of unit 18 is secured to stud 26 of channel member 24 by means of a screw 32 which extends through the housing and which is threaded into the stud. An alarm unit 34 is mounted in cap 28B. This unit, for example, may be a miniature piezo alarm which, when energized, emits a sharp tone. Such alarm units include a piezoelectric ceramic element. The units are readily available on the market. A battery 36 is supported within the housing 28. This battery, for example, may be a 9-volt battery. The battery is held in place by stud 26 at one end, and by a retaining sleeve 38 at the other end.

A shaft 21 is rotatably mounted in cap 28A, and tension arm 20 extends into the cap through a slot and is wrapped around the shaft, as best shown in FIGS. 6 and 7. The tension arm is formed of electrically conductive material. The shaft is preferably formed of a plastic material.

When the tension arm 20 is turned or bent clockwise from the position shown in FIG. 4, it engages a contactor pin 40 which, likewise is formed of electrically conductive material. A connector 42 is connected to one terminal of the alarm unit 34. Connector 42 may take the form of a beryllium copper split sleeve, which is sprung over the coiled portion of arm 20 providing a tensioned electrical contact to the temsion arm. The negative terminal of battery 36 is connected to a pin connector 48 mounted on pin 40 in electrical contact therewith. The positive terminal of battery 36 is connected to the other terminal of the alarm unit 34. When the tension arm 20 is bent due to increased tension of the fishing line 12 because of a bite, it contacts the pin 40, as explained above, and thereby completes the circuit to the alarm unit 34. The internal electrical connections are made by appropriate wires 52.

The knob 30 is attached to the end of shaft 21 by a pin 60 so that when the knob is turned, shaft 21 turns in cap 20A. A split sleeve 62 is mounted coaxially with shaft 21, sleeve 62 being molded into cap 28A to hold the sleeve against rotation. An annular spring 64 is mounted around the split sleeve and clamps the sleeve against the shaft 21 to cause the sleeve to exert a torsional force on the shaft so as to inhibit free rotation of the shaft. Elements 62 and 64 accordingly form a slip clutch for shaft 21. Shaft 21 and the attached tension arm 20 may be rotated by turning knob 30 to the left or to the right.

The invention provides, therefore, a simple and inexpensive electrical bite indicating unit which may be detachably mounted on a fishing pole and which provides a positive indication as to the occurrence of a bite so as to eliminate wasted pole staring intervals. As described above, the unit is mounted directly on the fishing pole by means of a permanent pole mount. The permanent pole mount may be formed, as described above, of a light weight aluminum channel, for example, and it is adhesively attached to the pole and permanently remains part of the pole. The electrical unit is then easily attached to the pole mount at the fishing site, and may be removed for transportation, change of battery and the like. Additional pole mounts may be placed on other poles, with one electrical unit being used for all mounts.

The operation of the unit is simple. With the fish line in normal position for casting out, and not engaged with the bite indicating unit, the bait is cast out and the pole is rested in position. The line is then reeled in to the desired tension. The line is then looped over the tension arm 20 of the unit. The arm is now ready to be adjusted for the lightest bite to be detected. The knob 30 is turned clockwise to bring the tension arm 20 and into electrical contact with the internal contactor pin 40 to activate the alarm unit 34. The knob 30 is then turned counterclockwise to back off the tension arm 20 from the pin 40 until the indicator is deactivated. A minimum pull from a bite will then spring the tension arm 20 forward to activate the alarm unit 34, so long as the pull is not of a momentary nature.

The basic tension pull of the fish line before a bite, along with added wind tension and, of course, tensions encountered in trolling lures through the water, can be precisely offset with the tension adjustment feature that barely holds the arm from signal contact. Set this way, the slightest additional tension resulting from a bite or strike activates the signal. Additionally, once set for the basic trolling tension, the accumulation of moss or debris on the lure provides additional tension necessary to signal the fisherman of the problem so that the lure may be corrected.

A number of radial bends may be formed on the tension arm 20. For example, an upper "delicate" bend may be provided to cause the alarm unit to be activated with an increased tension of the order of 1½ grams. A lower "trolling" bend may also be provided to offset basic line tensions up to one pound and actuate the alarm with the slightest of additional tension. More tensions can be had with a line pull point closer to the shaft, and a stronger clutch (62, 64) may be provided in models designed for commercial use.

In a further embodiment, the battery 36 and alarm unit 34 may be mounted in a separate housing, and only the switching and other components mounted in the unit itself. Specifically, only the arm and tensioning portion of the unit may be mounted on the pole and the battery and alarm unit mounted in a separate housing, with connecting wires extending either inside the pole or outside the pole and connected to the battery and indicator device by plugs and sockets. This latter construction provides the user with the ability to place the alarm unit in any convenient location, to provide for more easily heard signals when excessive extraneous noise conditions are encountered, such as noisy trolling, high winds and the like, and also serves to keep the alarm unit and battery in a protected environment, for example, with the fisherman inside a truck or car on cold, rainy days.

It will be appreciated, therefore, that although a particular embodiment of the invention has been shown and described, modifications may be made, and it is intended in the claims to cover all such modifications which come within the true spirit and scope of the invention.

What is claimed is:

1. A bite indicator for a fishing pole and adapted to be attached to the associated fishing line, including: an elongated channel member adhesively attached to the pole and extending coaxially along the pole, and a bite indicator unit attached to said elongated channel member, said bite indicator unit comprising: an elongated housing; a shaft mounted in said housing and extending transversely across said housing; an electrically conductive resilient tension arm mounted on said shaft and protruding through said housing in position to engage the fishing line associated with the pole and to be bent from a first angular position to a second angular position in response to increased tension on said line due to the occurrence of a bite, with said arm remaining in said first angular position for normal tension of said line; an electrically conductive contactor pin mounted in said housing and extending transversely thereacross in position to be engaged by said tension arm when said arm is in said second angular position; slip clutch means engaging said shaft to inhibit rotation thereof; manually controlled means mounted on said shaft for turning said shaft within said slip clutch means; battery means; electrically activated alarm means; and electric circuitry connecting said battery means to said alarm means and to said tension arm and said contactor pin to cause said alarm means to be activated when said tension arm engages said contactor pin.

2. The combination defined in claim 1, and which includes a stud mounted on said channel member and extending outwardly therefrom, and a screw extending through said housing for detachably mounting said bite indicator unit on said pole.

3. The combination defined in claim 1, in which said battery and said alarm means are mounted in said housing.

4. The combination defined in claim 1, in which said housing has a tubular configuration and is formed of electrically insulating plastic material.

5. The combination defined in claim 4, and which includes first and second caps formed of electrically insulating plastic material mounted on the respective ends of said tubular housing, said alarm means being mounted in one of said caps and said shaft being mounted in the other of said caps.

6. The combination defined in claim 1, in which said slip clutch means comprises a split sleeve coaxially mounted on said shaft and affixed to said housing to prevent rotation of said split sleeve, and an annular spring surrounding said sleeve to clamp said sleeve radially against said shaft.

7. The combination defined in claim 1, in which one end of said shaft extends through said housing, and said manually controlled means comprises a knob on said one end of said shaft.

* * * * *